(12) United States Patent
Seo et al.

(10) Patent No.: US 11,733,649 B2
(45) Date of Patent: Aug. 22, 2023

(54) METHOD OF GENERATING VOLUME HOLOGRAM USING POINT CLOUD AND MESH

(71) Applicant: KWANGWOON UNIVERSITY INDUSTRY-ACADEMIC COLLABORATION FOUNDATION, Seoul (KR)

(72) Inventors: Young Ho Seo, Seoul (KR); Kyung Jin Kim, Seoul (KR); Dong Wook Kim, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 234 days.

(21) Appl. No.: 17/184,767

(22) Filed: Feb. 25, 2021

(65) Prior Publication Data

US 2021/0263469 A1    Aug. 26, 2021

(30) Foreign Application Priority Data

Feb. 25, 2020    (KR) .......................... 10-2020-0023092

(51) Int. Cl.
*G03H 1/08*    (2006.01)
*G06T 17/20*    (2006.01)
(Continued)

(52) U.S. Cl.
CPC ......... *G03H 1/0841* (2013.01); *G03H 1/0248* (2013.01); *G03H 1/0866* (2013.01);
(Continued)

(58) Field of Classification Search
CPC ..... G01C 21/206; G06T 17/20; G06T 19/006; G06T 19/20; G06T 2200/04;
(Continued)

(56) References Cited

U.S. PATENT DOCUMENTS 9,955,084 B1 *  4/2018  Haynold ............... H04N 23/741
10,006,981 B2 *  6/2018  Tidhar ...................... G01S 3/04
(Continued)

FOREIGN PATENT DOCUMENTS

CN        108898551 A  * 11/2018  ........... G06T 3/4038
KR   10-2008-0086488 A    9/2008
(Continued)

*Primary Examiner* — Ming Wu
(74) *Attorney, Agent, or Firm* — NKL Law; Jae Youn Kim

(57) ABSTRACT

Disclosed is a method of generating a volume hologram using a point cloud and a mesh, in which a weight is given to a brightness of a light source according to a direction of a light in order to record a hologram of better quality. The method includes: (a) acquiring multi-view depth and color images; (b) generating point cloud data of a three-dimensional object from the acquired multi-view depth and color images; (c) generating mesh data of the three-dimensional object from the point cloud data of the three-dimensional object; (d) calculating a normal vector of each mesh from the mesh data of the three-dimensional object; (e) extracting three-dimensional data at a user viewpoint from the mesh data of the three-dimensional object by using the normal vector of the mesh; and (f) generating hologram data from three-dimensional data at the user viewpoint.

7 Claims, 7 Drawing Sheets

(51) Int. Cl.
*G03H 1/02* (2006.01)
*H04N 13/282* (2018.01)

(52) U.S. Cl.
CPC ....... *G06T 17/205* (2013.01); *G03H 2210/30* (2013.01); *G03H 2210/42* (2013.01); *G03H 2210/452* (2013.01); *H04N 13/282* (2018.05)

(58) Field of Classification Search
CPC ....... G06T 2207/20221; G06T 2210/08; G06T 2210/36; G06T 2219/024; G06T 2219/2004; G06T 2219/2024; G06T 7/32; H04W 84/12
See application file for complete search history.

(56) References Cited

U.S. PATENT DOCUMENTS

| | | | |
|---|---|---|---|
| 2010/0246973 A1* | 9/2010 | Kitago | G06T 17/20 382/248 |
| 2016/0203387 A1* | 7/2016 | Lee | G06T 3/00 348/44 |
| 2019/0043255 A1* | 2/2019 | Somasundaram | G06T 17/20 |
| 2021/0019953 A1* | 1/2021 | Pekelny | G06T 7/32 |

FOREIGN PATENT DOCUMENTS

| | | |
|---|---|---|
| KR | 10-2012-0045269 A | 5/2012 |
| KR | 10-2013-0094015 A | 8/2013 |
| KR | 10-2014-0100656 A | 8/2014 |
| KR | 10-1767299 B1 | 8/2017 |
| KR | 10-1927592 B1 | 12/2018 |
| WO | 2018-047687 A1 | 3/2018 |

\* cited by examiner

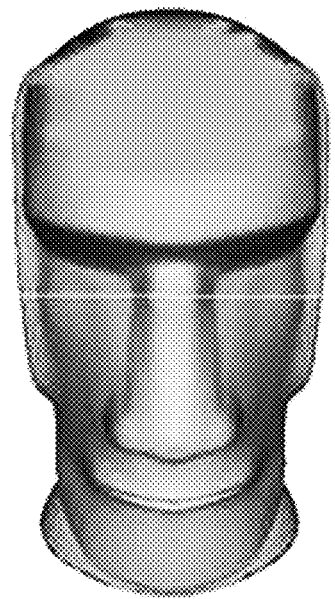
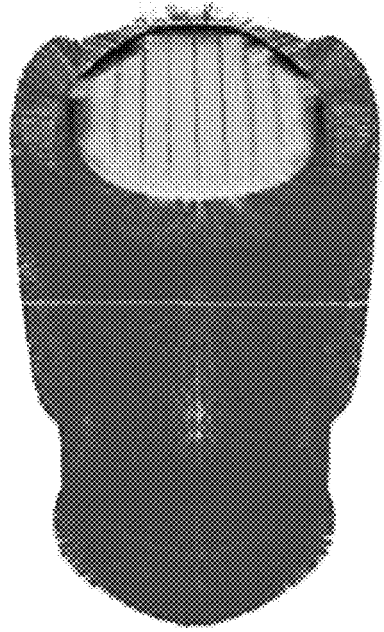
FIG. 5A                FIG. 5B
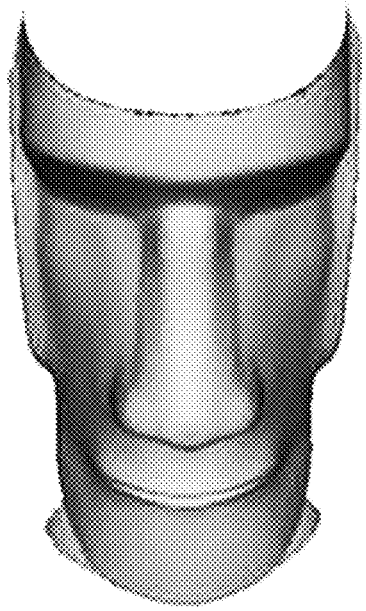
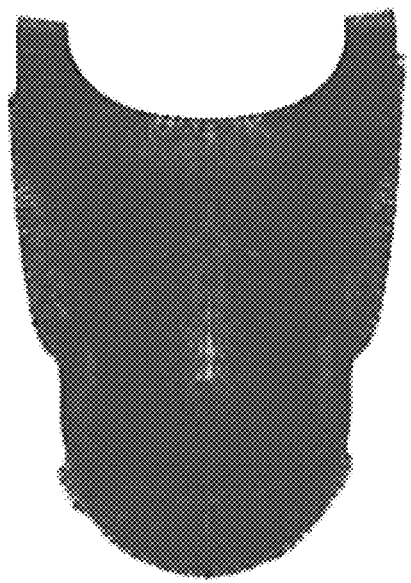
FIG. 5C                FIG. 5D

METHOD OF GENERATING VOLUME HOLOGRAM USING POINT CLOUD AND MESH

CROSS-REFERENCES TO RELATED APPLICATIONS

This application claims priority to and the benefit of Korean Patent Application No. 10-2020-0023092, filed on Feb. 25, 2020, the disclosure of which is incorporated herein by reference in its entirety.

BACKGROUND OF THE INVENTION

1. Field of the Invention

The present invention relates to a method of generating a volume hologram using a point cloud and a mesh, in which a real object is stored in the form of an omnidirectional three-dimensional point cloud and a mesh, a plurality of viewpoints of the stored point cloud are used to generate a hologram, and particularly, a weight is given to a brightness of a light source according to a direction of a light in order to record a hologram of better quality.

2. Description of the Related Art

Recently, studies on stereoscopic (three-dimensional) images and image reproducing technologies have been actively conducted. Stereoscopic image-related media are expected to lead the next generation of imaging devices as realistic image media of a new concept that improves visual information to the next level. While existing two-dimensional imaging systems provide flat images, a three-dimensional imaging system may be considered as an ultimate image implementation technology from a viewpoint of showing actual image information of an object to an observer.

Among schemes for reproducing the stereoscopic image, a holography scheme refers to a scheme that allows a user to perceive the same stereoscopic image as a real object without wearing special glasses when the user observes a hologram produced by using a laser. Accordingly, the holography scheme has been known as the most ideal scheme where a three-dimensional effect is excellent and an observer may perceive the stereoscopic image without fatigue.

The holography scheme uses a principle of recording an interference signal acquired by overlapping a light reflected from an object (object wave) and a light having coherency (reference wave), and reproducing the recorded interference signal. A hologram refers to a recording, on a photographic film, of an interference fringe (fringe pattern) formed by allowing an object wave, which uses a laser beam having high coherency so as to be scattered by colliding with an object, to meet a reference wave that is incident from another direction. When the object wave meets the reference wave, an interference fringe due to interference is formed, in which amplitude and phase information of the object are recorded together in the interference fringe. Holography refers to a process of reconstructing stereoscopic properties recorded in the hologram into a stereoscopic image by irradiating a reference light onto the recorded interference fringe.

As a scheme of generating a hologram by a computer for storage, transmission, and image processing, a computer-generated hologram (CGH) has been developed. The CGH may be configured such that an interference pattern between an object light and a reference light is calculated using a computer to generate hologram interference pattern data, the generated hologram interference pattern data is transmitted to a spatial light modulator (SLM), and the reference light using a laser is irradiated to the SLM to restore and reproduce a stereoscopic image corresponding to a hologram interference pattern implemented in the SLM.

In general, a CGH generation technology is broadly classified into a point source scheme based on three-dimensional information and a light field scheme based on an integrated image. The CGH generation technology adopting the point light source scheme is configured to assume a three-dimensional graphic object as a three-dimensional set of points (point cloud), calculate a hologram pattern for each of the points, and sum up all the calculated hologram patterns.

DOCUMENTS OF RELATED ART

Patent Documents (Patent document 1) Korean Patent Registration No. 10-1927592 (published on Dec. 4, 2018)
(Patent document 2) Korean Patent Registration No. 10-1767299 (published on Aug. 23, 2017)
(Patent document 3) Korean Unexamined Patent Publication No. 2012-0045269 (published on May 9, 2012)

SUMMARY OF THE INVENTION

To solve the problems as described above, an object of the present invention is to provide a method of generating a volume hologram using a point cloud and a mesh, in which a real object is stored in the form of an omnidirectional three-dimensional point cloud and a mesh, a plurality of viewpoints of the stored point cloud are used to generate a hologram, and particularly, a weight is given to a brightness of a light source according to a direction of a light in order to record a hologram of better quality.

To achieve the objects described above, according to the present invention, there is provided a method of generating a volume hologram using a point cloud and a mesh, the method including: (a) acquiring multi-view depth and color images; (b) generating point cloud data of a three-dimensional object from the acquired multi-view depth and color images; (c) generating mesh data of the three-dimensional object from the point cloud data of the three-dimensional object; (d) calculating a normal vector of each mesh from the mesh data of the three-dimensional object; (e) extracting three-dimensional data at a user viewpoint from the mesh data of the three-dimensional object by using the normal vector of the mesh; and (f) generating hologram data from three-dimensional data at the user viewpoint.

In addition, according to the present invention, in the method of generating the volume hologram using the point cloud and the mesh, in the step (a), the multi-view depth and color images may be images taken from all directions through an omnidirectional RGB-D camera system.

In addition, according to the present invention, in the method of generating the volume hologram using the point cloud and the mesh, in the step (b), a matching process of unifying data of the multi-view depth and color images into one coordinate system may be performed to generate the point cloud data of the three-dimensional object in one coordinate system.

In addition, according to the present invention, in the method of generating the volume hologram using the point cloud and the mesh, in the step (c), the point cloud data of the three-dimensional object may be sampled and converted into the mesh data of the three-dimensional object by using a Delaunay triangulation scheme.

In addition, according to the present invention, in the method of generating the volume hologram using the point cloud and the mesh, in the step (e), a direction vector at the user viewpoint may be acquired, an inner product of the direction vector at the user viewpoint and the normal vector of the mesh may be calculated to extract only a mesh where a result value of the inner product is a non-negative number, and the extracted mesh may serve as the three-dimensional data at the user viewpoint.

In addition, according to the present invention, in the method of generating the volume hologram using the point cloud and the mesh, the direction vector at the user viewpoint may be acquired by setting a Z-axis direction as a basic direction vector, and rotating the basic direction vector by using a yaw, a pitch, and a roll at a rotated user viewpoint.

In addition, according to the present invention, in the method of generating the volume hologram using the point cloud and the mesh, the direction vector at the user viewpoint may be calculated by the following formula 1:

$$\vec{Z'} = R(\theta_z)R(\theta_x)R(\theta_y)\vec{Z},$$

wherein $\theta_z$, $\theta_x$, and $\theta_y$ are a yaw, a pitch, and a roll at a user viewpoint, respectively, and $$\vec{Z} = (0, 0, 1)$$
$$R(\theta_z) = \begin{pmatrix} \cos(\theta_z) & -\sin(\theta_z) & 0 \\ \sin(\theta_z) & \cos(\theta_z) & 0 \\ 0 & 0 & 1 \end{pmatrix}$$
$$R(\theta_x) = \begin{pmatrix} 0 & 0 & 0 \\ 0 & \cos(\theta_x) & -\sin(\theta_x) \\ 0 & 0 & \cos(\theta_x) \end{pmatrix}.$$
$$R(\theta_y) = \begin{pmatrix} \cos(\theta_y) & 0 & -\sin(\theta_y) \\ 0 & 1 & 0 \\ \sin(\theta_y) & 0 & \cos(\theta_y) \end{pmatrix}$$

In addition, according to the present invention, in the method of generating the volume hologram using the point cloud and the mesh, in the step (f), with respect to the extracted three-dimensional data at the user viewpoint, a density of the three-dimensional data may be adjusted, and the hologram data may be generated from the three-dimensional data at the user viewpoint in which the density is adjusted.

In addition, according to the present invention, in the method of generating the volume hologram using the point cloud and the mesh, with respect to mesh data corresponding to the extracted three-dimensional data at the user viewpoint, a size of each mesh may be measured to determine whether the measured mesh size is less than a threshold value, the mesh may be divided by adding a point to the mesh when the measured mesh size is greater than the threshold value, and the division process may be repeatedly performed such that all meshes are divided to have a size less than the threshold value, thereby adjusting the density.

In addition, according to the present invention, in the method of generating the volume hologram using the point cloud and the mesh, with respect to a mesh having a size greater than or equal to the threshold value, a location of the point to be generated may be calculated by using a circumcenter of a triangle, color information of the generated point may have an average value of each point, and a normal vector may be set as a normal vector of the mesh, thereby adding the point.

In addition, according to the present invention, in the method of generating the volume hologram using the point cloud and the mesh, in the step (f), the hologram data may be generated by adjusting a brightness of each point of the object.

In addition, according to the present invention, in the method of generating the volume hologram using the point cloud and the mesh, the brightness of each point may be adjusted by giving a weight to a brightness of a light source such that the weight is given in proportion to an absolute value of an inner product of a direction vector at the user viewpoint and the normal vector of the mesh of the point.

In addition, according to the present invention, there is provided a computer-readable recording medium that stores a program for executing a method of generating a volume hologram using a point cloud and a mesh.

As described above, according to the method of generating the volume hologram using the point cloud and the mesh of the present invention, the real object is stored in the form of the three-dimensional point cloud and the mesh, and the plurality of viewpoints of the stored point cloud are used to generate the hologram, so that a hologram having the same quality at all viewpoints can be generated.

In addition, according to the method of generating the volume hologram using the point cloud and the mesh of the present invention, the weight is given to the brightness of the light source according to the direction of the light, so that the hologram of better quality can be recorded.

BRIEF DESCRIPTION OF THE DRAWINGS

FIG. 4A is a picture of a normal vector for one mesh, and FIG. 4B is a picture of each of meshes constituting a surface of an object including the normal vector.

FIGS. 5A-5D are views illustrating acquired three-dimensional data according to one embodiment of the present invention, including FIG. 5A is an original omnidirectional mesh, FIG. 5B is a mesh including a normal vector, FIG. 5C is a mesh of a portion located on a front side, and FIG. 5D is a mesh located on the front side and including the normal vector.

FIG. 8A is a front view, FIG. 8B is a side view, and FIG. 8C is a rear view that illustrate the reconstructed image of the hologram before applying a weight to a brightness value of an object point, and FIG. 8D is a front view, FIG. 8E is a side view, and FIG. 8F is a rear view that illustrate the reconstructed image of the hologram after applying the weight.

DETAILED DESCRIPTION OF THE INVENTION

Figure 1:
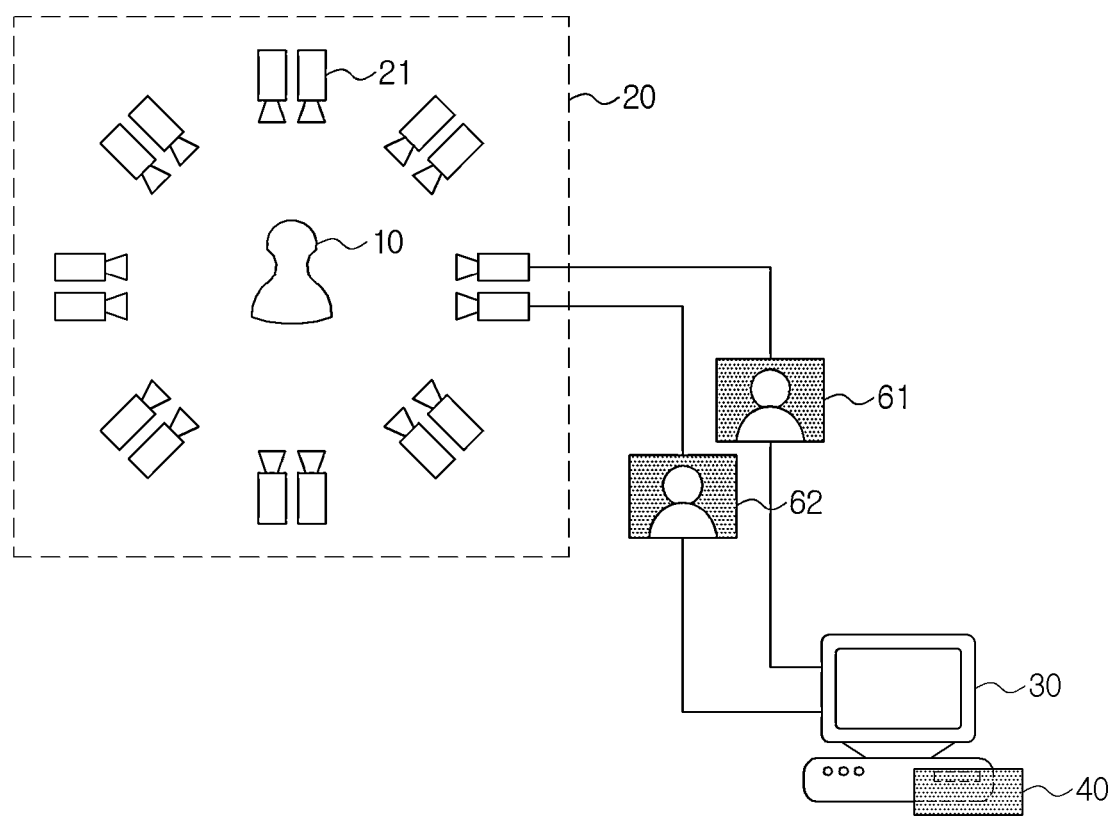
FIG. 1 is a view showing the configuration of an entire system for implementing the present invention.

Hereinafter, the present invention will be described in detail for implementation of the present invention with reference to the drawings.

In addition, in describing the present invention, like elements are denoted by like reference numerals, and redundant descriptions thereof will be omitted.

First, examples of the configuration of an entire system for implementing the present invention will be described with reference to FIG. 1.

As shown in FIG. 1, a method of generating a volume hologram using a point cloud and a mesh according to the present invention may be implemented by a program system on a computer terminal 30, which is configured to generate a hologram by receiving multi-view depth and color (RGB, etc.) images 60 photographed by an RGB-D camera system 20. In other words, the method of generating the volume hologram may be configured as a program so as to be installed and executed in the computer terminal 30. The program installed in the computer terminal 30 may operate similarly to one program system 40.

Meanwhile, as another embodiment, the method of generating the volume hologram may be configured as one electronic circuit such as an application-specific integrated circuit (ASIC) so as to be implemented in addition to being configured as a program and operating on a general-purpose computer. Alternatively, a dedicated computer terminal 30 for exclusively processing only a process of generating a volume hologram from multi-view depth and color images may be developed. This will be referred to as a volume hologram generation system 40. Other possible forms may also be implemented.

Meanwhile, the RGB-D camera system 20 may include a plurality of RGB-D cameras 21 for photographing an object 10 at mutually different viewpoints.

In addition, each of the RGB-D cameras 21 may include a depth camera and a color camera (or an RGB camera). The depth camera refers to a camera for measuring a depth of the object 10, and the depth camera may output a depth video or image 61 by measuring depth information. The color camera refers to a conventional RGB camera, and the color camera may acquire a color video or image 62 of the object 10.

A multi-view depth image 61 and a multi-view color image 62 photographed by the multi-view RGB-D camera 20 may be directly input to and stored in the computer terminal 30, and processed by the volume hologram generation system 40. Alternatively, the multi-view depth image 61 and the multi-view color image 62 may be pre-stored in a storage medium of the computer terminal 30, and the depth image 60 stored by the volume hologram generation system 40 may be read and input to the computer terminal 30.

A video includes temporally consecutive frames. For example, when a frame at a current time t is set as a current frame, a frame at an immediately preceding time t−1 will be referred to as a previous frame, and a frame at t+1 will be referred to as a next frame. Meanwhile, each of the frames may have a color video (or a color image) and a depth video (or depth information).

In particular, the object 10 may be photographed at the mutually different viewpoints a plurality of times corresponding to a number of the multi-view RGB-D cameras 20, and at a specific time t, the multi-view depth and color images 61 and 62 as many as the number of the cameras may be acquired.

Meanwhile, the depth video 61 and the color video 62 may include temporally consecutive frames. One frame may have one image. In addition, each of the videos 61 and 62 may have one frame (or one image). In other words, each of the videos 61 and 62 may be configured as one image.

Although generation of the hologram from the multi-view depth image and the multi-view color image means detection from each depth/color frame (or image), in the following, unless it is especially necessary for distinction, the terms "video" and "image" will be used interchangeably.

Figure 2:
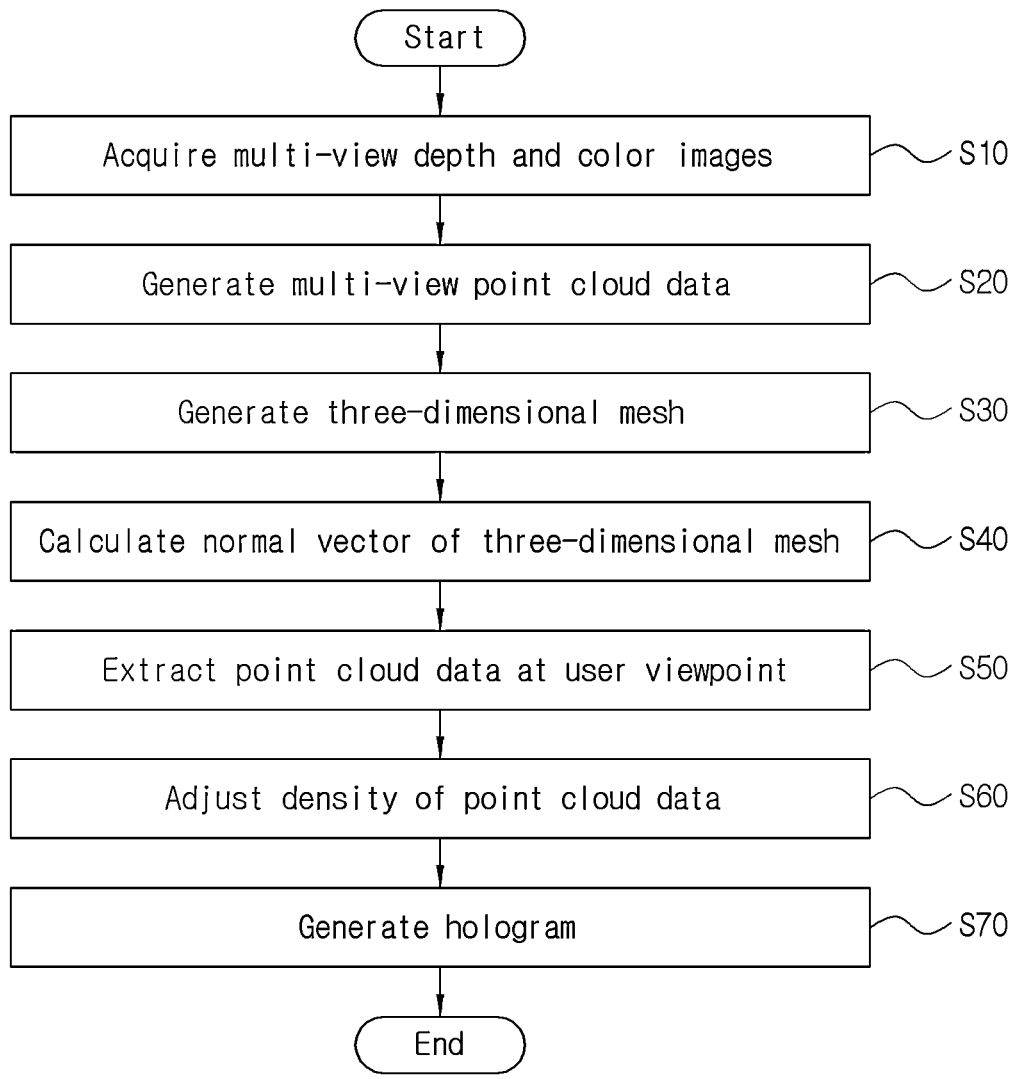
FIG. 2 is a flowchart for describing a method of generating a volume hologram using a point cloud and a mesh according to one embodiment of the present invention.

Next, the method of generating the volume hologram using the point cloud and the mesh according to one embodiment of the present invention will be described with reference to FIGS. 2 and 3. FIG. 2 is a flowchart for describing a method of generating a volume hologram according to one embodiment of the present invention, and FIG. 3 is a view schematically showing a process of the method according to the present invention.

A computer-generated hologram (CGH) may be obtained by acquiring fringe patterns for all light sources input from all coordinates of a hologram plane, and accumulating the patterns. Therefore, only a light source input to the hologram plane, that is, a specific viewpoint may be recorded in the hologram. The present invention proposes a method in which a user may recognize all viewpoints of an object through a hologram by using omnidirectional three-dimensional data based on an actual image.

Figure 3:
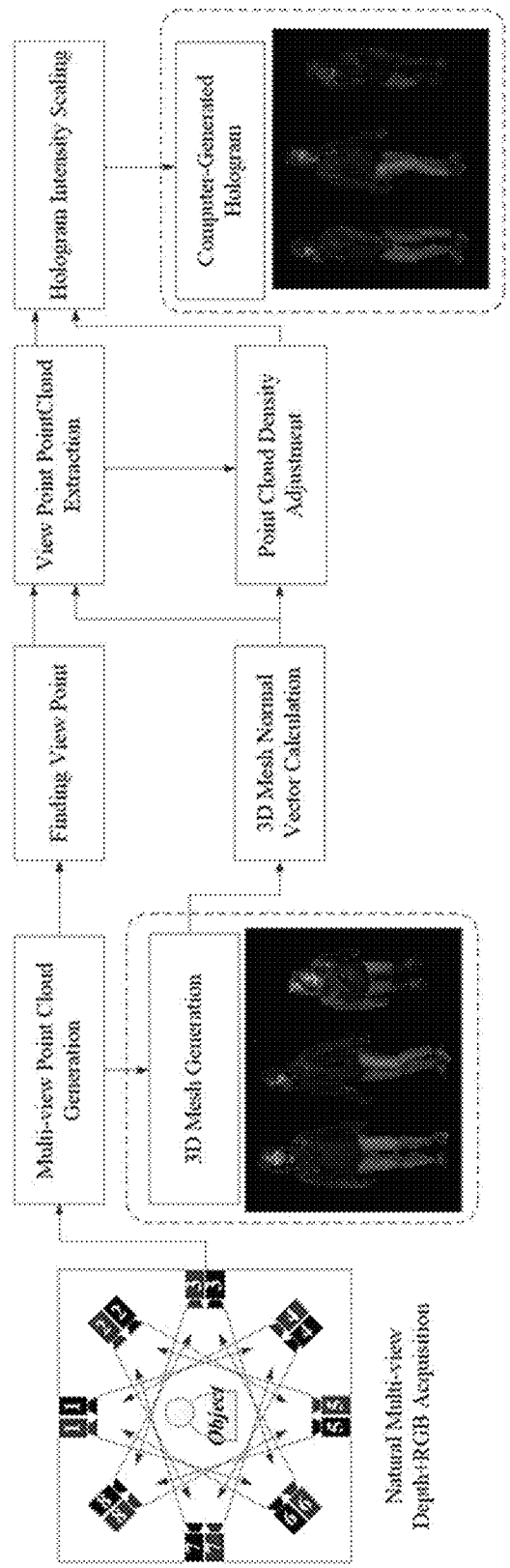
FIG. 3 is a view showing a process of the method of generating the volume hologram using the point cloud and the mesh according to one embodiment of the present invention.

As shown in FIG. 2 or 3, first, in order to generate a hologram of a desired viewpoint, a desired object may be photographed from all directions through an omnidirectional RGB-D camera system to acquire multi-view depth and color images (S10). Then, multi-view point cloud data may be generated by using the photographed depth and color images (S20), and the generated multi-view point cloud data may be converted into a mesh (S30).

Next, in order to generate a hologram at a user viewpoint by using photographed mesh data, a viewing direction of a user may be found, and a normal vector of the mesh may be calculated (S40). Point cloud data at the user viewpoint may be extracted by selecting only a mesh corresponding to the user viewpoint by using the normal vector of the mesh (S50). Then, a density of all portions of a point cloud input to the CGH may be set to be uniform (S60). In addition, a hologram having the same quality at all viewpoints may be generated (S70). In this case, a complete complex hologram may be generated by adjusting a brightness of a light source by using a normal vector of each point.

Hereinafter, each step will be described in detail.

First, the desired object may be photographed from all directions through the omnidirectional RGB-D camera system to acquire the multi-view depth and color images (S10). Preferably, in order to generate a three-dimensional model based on an actual image, eight RGB-D cameras may be installed vertically in all directions by using a stand-type camera system. The depth and RGB images photographed by a plurality of RGB-D cameras installed as described above may be acquired.

Next, point cloud data of a three-dimensional object may be generated by matching point cloud data from the photographed depth and color images (S20).

As described in the previous example, the point cloud may be generated by using the depth and color images photographed by the eight cameras. In this case, a matching process of unifying data output from each of the cameras into one coordinate system may be performed. Through the above process, point cloud data of one three-dimensional object may be generated. In other words, the point cloud data of one three-dimensional object may be generated by matching the point cloud data of each viewpoint. In this case, the point cloud data of the three-dimensional object refers to data including three-dimensional location coordinates (x, y, z) and color values at corresponding coordinates.

A point cloud refers to a set of points constituting a surface of a three-dimensional object. The data output from eight RGB-D cameras may be output as point clouds having mutually different coordinate systems (according to coordinate systems of the cameras). When the eight data are output into one configuration, it is difficult to recognize the configuration as one object. However, when the point cloud matching process is performed, the eight point clouds may be integrated into one coordinate system, and when the coordinate system is integrated, one object may be formed. In other words, one object may be formed through the process of matching the coordinate systems of the eight point clouds.

Next, a three-dimensional model such as mesh data may be generated from the point cloud data of the three-dimensional object (S30).

Before generating the three-dimensional model, the point cloud data of the three-dimensional object may be sampled. When the point cloud data is converted into a mesh, three point clouds may be connected to form one mesh. In this case, instead of connecting all points to form a mesh, the number of points may be reduced (sampled) so long as there is no lack of details. Thereafter, the points may be connected to generate the mesh.

Preferably, the point cloud data of the three-dimensional object may be converted into the mesh data by applying a scheme such as Delaunay triangulation. Delaunay triangulation refers to a division scheme in which when a space is divided by connecting points in the space in triangles, a minimum value of an inner angle of the triangles becomes the maximum. In particular, the Delaunay triangulation scheme may be configured to perform the division such that any circumscribed circle of a triangle does not include any point other than three vertices of the triangle.

Through the previous process, an omnidirectional three-dimensional model based on an actual image may be generated.

Next, a normal vector of a three-dimensional mesh may be calculated (S40), and the point cloud data at the user viewpoint may be extracted by using the calculated normal vector of the three-dimensional mesh (S50).

The user viewpoint may be determined in advance, or selected by the user or the like. In this case, before generating a digital hologram, a process of selecting data corresponding to the user viewpoint from omnidirectional three-dimensional data is required. To this end, the point cloud, the normal vector of the mesh, and information on a yaw, a pitch, and a roll corresponding to the user viewpoint are required.

The user viewpoint is given by the information on the yaw, the pitch, and the roll.

First, a normal vector calculation step S40 will be described.

Figure 4A:
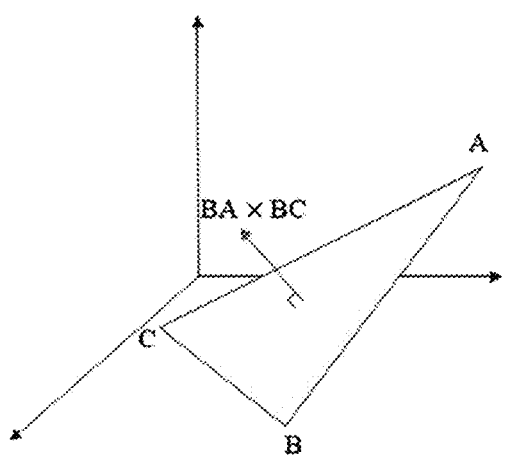
FIGS. 4A-4B are views illustrating a normal vector of a mesh according to one embodiment of the present invention, including
Figure 4B:
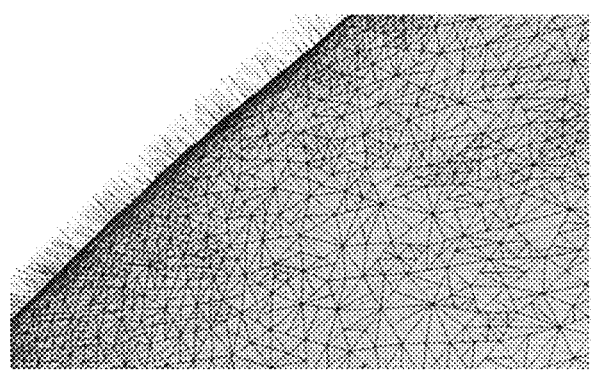

The normal vector of the mesh refers to a vector perpendicular to a surface of the mesh. The normal vector may be calculated through an outer product of two line segment vectors constituting the mesh. FIGS. 4A-4B are views showing a normal vector of a mesh.

Referring to FIGS. 4A-4B, the normal vector of the mesh including points A, B, and C may be BA×BC. According to the right-hand rule, the normal vector of the mesh may also be calculated by CB×CA and AC×AB. The final normal vector may be a unit vector obtained by dividing the normal vector by absolute values of (a, b, c). A normal vector of the point cloud may be set to be the same as the normal vector of the mesh.

Next, a step S50 of extracting data at the user viewpoint will be described.

When the object acquired by using the RGB-D camera has not been rotated arbitrarily, the object may be placed in a user front direction $\vec{Z}=(0, 0, 1)$. When the user viewpoint varies, a Z-direction vector may be rotated by using a yaw, a pitch, and a roll at a rotated viewpoint. A value of the rotated Z-direction vector may be a direction in which the user views the object. The yaw, the pitch, and the roll may be denoted by $\theta_z$, $\theta_x$, and $\theta_y$, respectively, and the rotated viewpoint $R(\theta_z)$, $R(\theta_x)$, $R(\theta_y)$ may be expressed as follows.

$$\begin{pmatrix} \cos(\theta_z) & -\sin(\theta_z) & 0 \\ \sin(\theta_z) & \cos(\theta_z) & 0 \\ 0 & 0 & 1 \end{pmatrix}$$

[Mathematical formula 1]

$$\begin{pmatrix} 0 & 0 & 0 \\ 0 & \cos(\theta_x) & -\sin(\theta_x) \\ 0 & 0 & \cos(\theta_x) \end{pmatrix} \begin{pmatrix} \cos(\theta_y) & 0 & \sin(\theta_y) \\ 0 & 1 & 0 \\ -\sin(\theta_y) & 0 & \cos(\theta_y) \end{pmatrix}$$

Therefore, a direction vector Z', which is a viewing direction of the user, may be expressed as follows.

$$\vec{Z'}=R(\theta_z)R(\theta_x)R(\theta_y)\vec{Z}$$

[Mathematical formula 2]

In this case, $\vec{Z}$ denotes a (0, 0, 1) vector (or a z-direction vector), and $\vec{Z'}$ denotes a direction vector in which the user views the object (hereinafter referred to as "direction vector Z'").

A scheme of acquiring data in a direction viewed by the user may be selected through an inner product of the direction vector Z' (the direction vector at the user viewpoint) and the normal vector.

When a result value of the inner product is a negative number, it means that there is an angle difference of 90 degrees or more, which may correspond a portion viewed by the user. FIGS. 5A-5D show the selected data when the user viewpoint is placed on a front side of the object. In other words, an inner product of the direction vector at the user viewpoint and the normal vector may be obtained to select (filter) a mesh where a result value of the inner product is a non-negative number.

The filtered meshes may be extracted as three-dimensional data at the user viewpoint. In other words, point cloud data of the selected mesh may be point cloud data at the user viewpoint. In the previous process, although the mesh data at the user viewpoint has been extracted, points on the mesh of the mesh data may be the point cloud data. In this context, the three-dimensional data at the user viewpoint refers to both the mesh data and the point cloud data. In other words, the three-dimensional data at the user viewpoint, the mesh data at the user viewpoint, and the point cloud data at the user viewpoint will be used interchangeably.

Next, a density of the extracted point cloud data at the user viewpoint may be adjusted (S60).

Portions of the point cloud acquired through the camera system may have mutually different densities. When CGH is acquired by using a portion having a low density due to a hole or the like, the portion may have quality lower than quality of a portion having a high density. Therefore, in order to obtain a hologram having uniform quality for all viewpoints, the density of the point cloud may be adjusted by using the mesh.

Figure 6:
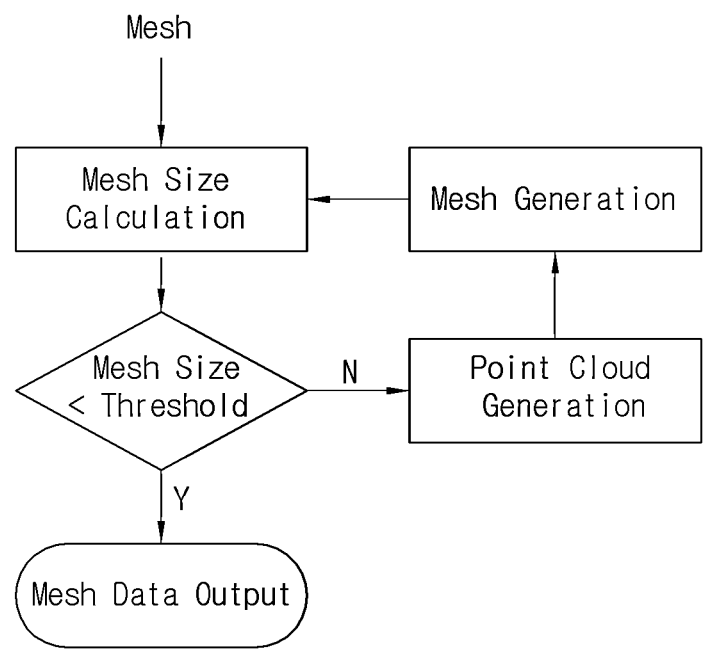
FIG. 6 is a flowchart for describing a step of adjusting a density of point cloud data according to one embodiment of the present invention.

FIG. 6 is a flowchart for describing a step of adjusting a density of a point cloud (point cloud data) by using a mesh.

As shown in FIG. 6, a size of the mesh may be measured to determine whether the measured mesh size is less than a threshold value. When the measured mesh size is greater than the threshold value, the mesh may be divided by adding a point to the mesh. The above process may be repeatedly performed such that all meshes are divided to have a size less than the threshold value.

In this case, the mesh may be used to calculate the density of the point cloud. Since the mesh is generated by using three closest points, when the size of the mesh is small, it means that point clouds in a corresponding portion are close to each other. In other words, it may be determined that a point cloud density of the portion is high. On the contrary, when the size of the mesh is large, it may be determined that the point cloud density of a corresponding portion is low.

Therefore, a mesh having a size greater than or equal to the threshold value may be subject to a process of adding a point cloud. A scheme of adding a point may use a Voronoi diagram.

Figure 7:
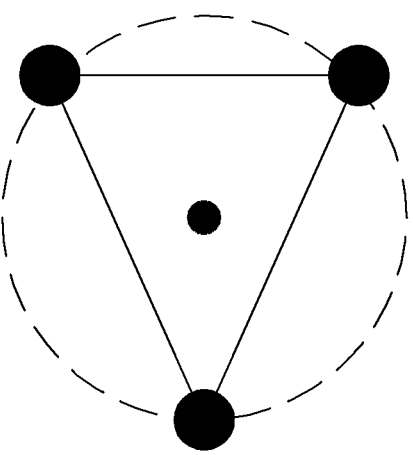
FIG. 7 is a view illustrating points constituting a mesh and a point generated through a Voronoi diagram according to one embodiment of the present invention.
Figure 8A:
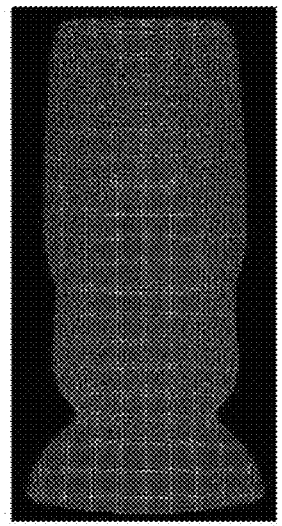
FIGS. 8A-8F are views illustrating a reconstructed image of a hologram according to one embodiment of the present invention, including
Figure 8B:
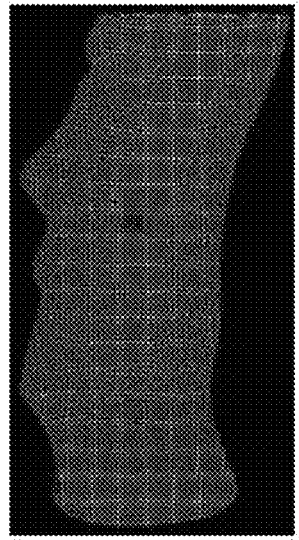
Figure 8C:
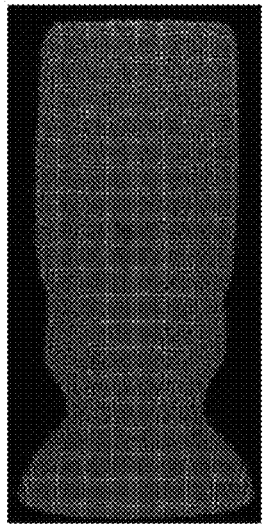
Figure 8D:
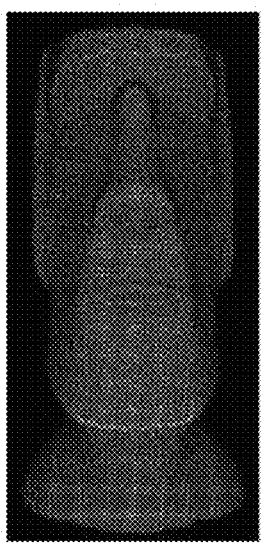
Figure 8E:
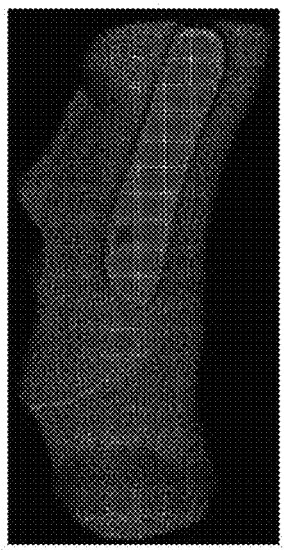
Figure 8F:
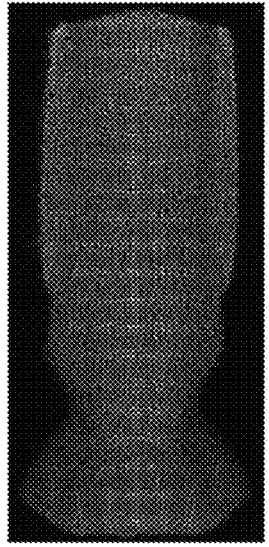

FIG. 7 is a view for describing a scheme of generating a Voronoi diagram by using points constituting a mesh.

Red points represent points that are previously acquired, and a black point represents a point added through the Voronoi diagram. This scheme may calculate a location of the point to be generated by using a circumcenter of a triangle. Color information of the generated point may have an average value of each point, and a normal vector may be set according to the normal vector of the mesh.

When the point is added as described above, the point may be connected with existing points to divide the mesh into three meshes. When a size of the mesh obtained by the division is also greater than or equal to the threshold value, the above process may be repeated.

Through the above process, the density of the point cloud used for the CGH may be uniformly maintained.

Next, the hologram may be generated from the point cloud data in which the density is adjusted by adjusting a brightness of each point of the object (S70).

The following mathematical formula may express a CGH formula of a real part for generating a complete complex hologram.

[Mathematical formula 3]
$$I_{Re}(u, v) \sum_{i=0}^{N} W_i(x, y, z) A_i(x, y, z)$$
$$\cos\left[2\pi\left\{\frac{z}{\lambda} + \frac{p^2}{2\lambda z}(u-x)^2 + \frac{p^2}{2\lambda z}(v-y)^2\right\}\right]$$

In this case, I(u, v) denotes a brightness at coordinates u, v of a hologram plane, and the hologram plane may be a location of the user. In addition, $A_i(x, y, z)$ denotes a brightness of a light source in x, y, z coordinates.

In this case, as the x, y, z coordinates becomes closer to the hologram plane, the brightness may become higher. However, since a direction in which a light is directed also affects the brightness, a weight has to be given to the brightness of the light source by using an angle between the hologram plane and the direction in which the light is directed in the x, y, z coordinates. The weight is denoted by $W_i(x, y, z)$ in Mathematical formula 3.

Since the hologram is generated by selecting the point cloud or the mesh at the user viewpoint, a normal direction of the hologram plane will be the same direction as the user viewpoint. In addition, the direction in which the light is directed in the x, y, z coordinates may be the same as the normal direction of the coordinates. Therefore, the weight may be applied to the brightness by using the direction in which the user views the object (a→) and the normal vector of the mesh or the point cloud (b→) obtained in the above process. The weight may be an absolute value of an inner product of the vectors a→ and b→. Preferably, the weight may be set in proportion to the absolute value of the inner product.

The direction in which the user views the object (a→) may be the direction vector Z' at the user viewpoint.

FIGS. 8A-8F are views showing reconstructed holograms before and after giving a weight to a brightness of the hologram according to a direction of a light. In other words, FIGS. 8A-8F are views showing a hologram before and after giving the weight to a brightness value.

In Mathematical formula 3, N denotes a number of light sources, λ denotes a wavelength of a reference wave used to generate a hologram, and p denotes a size of each of a hologram and a pixel of a light source, wherein the sizes are considered as the same value for convenience.

In the present invention, a process of Mathematical formula 3 may be separated as in the following mathematical formulas 4 and 5. In other words, a fringe pattern may be generated for each object point by using Mathematical formula 4. The generated fringe pattern may be multiplied by a brightness value, and cumulative addition may be performed to generate a final hologram as in Mathematical formula 5.

[Mathematical formula 4]
$$f_{Re}(u, v) = \cos\left[2\pi\left\{\frac{z}{\lambda} + \frac{p^2}{2\lambda z}(u-x)^2 + \frac{p^2}{2\lambda z}(v-y)^2\right\}\right]$$

[Mathematical formula 5]
$$I_{Re}(u, v) \sum_{i=0}^{N} (W_i(x, y, z) \times A_i(x, y, z) \times f_{Re}(u, v))$$

Although the present invention invented by the present inventor has been described in detail with reference to the above embodiments, the present invention is not limited to the embodiments, and various modifications are possible without departing from the gist of the present invention.

What is claimed is:

1. A method of generating a volume hologram using a point cloud and a mesh, the method comprising:
    (a) acquiring multi-view depth and color images;
    (b) generating point cloud data of a three-dimensional object from the acquired multi-view depth and color images;
    (c) generating mesh data of the three-dimensional object from the point cloud data of the three-dimensional object;
    (d) calculating a normal vector of each mesh from the mesh data of the three-dimensional object;
    (e) extracting three-dimensional data at a user viewpoint from the mesh data of the three-dimensional object by using the normal vector of the mesh; and (f) generating hologram data from the three-dimensional data at the user viewpoint,
wherein, in the step (f), the hologram data is generated by adjusting a brightness of each point of the object, and
wherein the brightness of each point is adjusted by giving a weight to a brightness of a light source such that the weight is given in proportion to an absolute value of an inner product of a direction vector at the user viewpoint and the normal vector of the mesh of the point.

2. The method of claim 1, wherein, in the step (a), the multi-view depth and color images are images taken from all directions through an omnidirectional RGB-D camera system.

3. The method of claim 1, wherein, in the step (b), a matching process of unifying data of the multi-view depth and color images into one coordinate system is performed to generate the point cloud data of the three-dimensional object in one coordinate system.

4. The method of claim 1, wherein, in the step (c), the point cloud data of the three-dimensional object is sampled and converted into the mesh data of the three-dimensional object by using a Delaunay triangulation scheme.

5. A method of generating a volume hologram using a point cloud and a mesh, the method comprising:
(a) acquiring multi-view depth and color images;
(b) generating point cloud data of a three-dimensional object from the acquired multi-view depth and color images;
(c) generating mesh data of the three-dimensional object from the point cloud data of the three-dimensional object;
(d) calculating a normal vector of each mesh from the mesh data of the three-dimensional object;
(e) extracting three-dimensional data at a user viewpoint from the mesh data of the three-dimensional object by using the normal vector of the mesh; and
(f) generating hologram data from the three-dimensional data at the user viewpoint,
wherein, in the step (e), a direction vector at the user viewpoint is acquired, an inner product of the direction vector at the user viewpoint and the normal vector of the mesh is calculated to extract only a mesh where a result value of the inner product is a non-negative number, and the extracted mesh serves as the three-dimensional data at the user viewpoint, and
wherein the direction vector at the user viewpoint is acquired by setting a Z-axis direction as a basic direction vector, and rotating the basic direction vector by using a yaw, a pitch, and a roll at a rotated user viewpoint.

6. The method of claim 5, wherein the direction vector at the user viewpoint is calculated by the following formula 1:

$$\vec{Z'} = R(\theta_z) R(\theta_x) R(\theta_y) \vec{Z},$$

wherein $\theta_z$, $\theta_x$, and $\theta_y$ are a yaw, a pitch, and a roll at a user viewpoint, respectively, and $$\vec{Z} = (0, 0, 1)$$
$$R(\theta_z) = \begin{pmatrix} \cos(\theta_z) & -\sin(\theta_z) & 0 \\ \sin(\theta_z) & \cos(\theta_z) & 0 \\ 0 & 0 & 1 \end{pmatrix}$$
$$R(\theta_x) = \begin{pmatrix} 0 & 0 & 0 \\ 0 & \cos(\theta_x) & -\sin(\theta_x) \\ 0 & 0 & \cos(\theta_x) \end{pmatrix}.$$
$$R(\theta_y) = \begin{pmatrix} \cos(\theta_y) & 0 & -\sin(\theta_y) \\ 0 & 1 & 0 \\ \sin(\theta_y) & 0 & \cos(\theta_y) \end{pmatrix}$$

7. A method of generating a volume hologram using a point cloud and a mesh, the method comprising:
(a) acquiring multi-view depth and color images;
(b) generating point cloud data of a three-dimensional object from the acquired multi-view depth and color images;
(c) generating mesh data of the three-dimensional object from the point cloud data of the three-dimensional object;
(d) calculating a normal vector of each mesh from the mesh data of the three-dimensional object;
(e) extracting three-dimensional data at a user viewpoint from the mesh data of the three-dimensional object by using the normal vector of the mesh; and
(f) generating hologram data from the three-dimensional data at the user viewpoint,
wherein, in the step (e), a direction vector at the user viewpoint is acquired, an inner product of the direction vector at the user viewpoint and the normal vector of the mesh is calculated to extract only a mesh where a result value of the inner product is a non-negative number, and the extracted mesh serves as the three-dimensional data at the user viewpoint,
wherein, in the step (f), with respect to the extracted three-dimensional data at the user viewpoint, a density of the three-dimensional data is adjusted, and the hologram data is generated from the three-dimensional data at the user viewpoint in which the density is adjusted,
wherein, with respect to mesh data corresponding to the extracted three-dimensional data at the user viewpoint, a size of each mesh is measured to determine whether the measured mesh size is less than a threshold value, the mesh is divided by adding a point to the mesh when the measured mesh size is greater than the threshold value, and the division process is repeatedly performed such that all meshes are divided to have a size less than the threshold value, thereby adjusting the density, and
wherein, with respect to a mesh having a size greater than or equal to the threshold value, a location of the point to be generated is calculated by using a circumcenter of a triangle, color information of the generated point has an average value of each point, and a normal vector is set as a normal vector of the mesh, thereby adding the point.

* * * * *